(12) United States Patent
Abraham et al.

(10) Patent No.: US 9,345,026 B2
(45) Date of Patent: May 17, 2016

(54) METHODS AND APPARATUS FOR REQUESTED REVERSE DIRECTION PROTOCOL

(71) Applicant: QUALCOMM Incorporated, San Diego, CA (US)

(72) Inventors: Santosh Paul Abraham, San Diego, CA (US); Alfred Asterjadhi, San Diego, CA (US); Amin Jafarian, San Diego, CA (US); Simone Merlin, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 336 days.

(21) Appl. No.: 13/935,373

(22) Filed: Jul. 3, 2013

(65) Prior Publication Data

US 2014/0010211 A1    Jan. 9, 2014

Related U.S. Application Data

(60) Provisional application No. 61/669,632, filed on Jul. 9, 2012, provisional application No. 61/699,080, filed on Sep. 10, 2012, provisional application No. 61/763,413, filed on Feb. 11, 2013.

(51) Int. Cl.
*H04W 72/12* (2009.01)
*H04W 72/04* (2009.01)
*H04W 74/06* (2009.01)

(52) U.S. Cl.
CPC .......... *H04W 72/0446* (2013.01); *H04W 74/06* (2013.01)

(58) Field of Classification Search
CPC ............ H04W 72/0446; H04W 72/12; H04W 72/014; H04W 72/1294; H04W 74/06; H04W 16/06; H04W 74/002; H04W 12/40065; H04W 2012/6456; H04B 7/0632; H04B 17/309; H04L 1/16; H04Q 2213/391–2213/392

USPC ......... 370/252, 310–311, 328–330, 336, 338, 370/345, 445, 46; 455/512, 550.1, 553, 455/553.1

See application file for complete search history.

(56) References Cited

U.S. PATENT DOCUMENTS 8,069,248 B2    11/2011    Sherman
8,223,639 B2 *  7/2012    Seok ................. H04W 74/0816
                                                   370/230

(Continued)

FOREIGN PATENT DOCUMENTS

EP            2369894 A1    9/2011
WO    WO-2010013897 A2    2/2010

OTHER PUBLICATIONS

International Search Report and Written Opinion—PCT/US2013/049484—ISA/EPO—Dec. 9, 2013.

(Continued)

*Primary Examiner* — Mohamed Kamara
(74) *Attorney, Agent, or Firm* — Knobbe Martens Olsen & Bear, LLP

(57) ABSTRACT

Systems, methods, and devices for communicating data in a wireless communications network are described herein. In some aspects, a first wireless device may request to transmit data during a transmission opportunity of a second wireless device. The request may also indicate a duration of time for which permission to transmit is requested. In some aspects, the second wireless device may send a response message to the first wireless device indicating the first wireless device has been granted permission to transmit during a transmission opportunity of the second wireless device. The response may include an indication of a period of time for which permission to transmit has been granted. In an embodiment, the response may include an indication of a period of time the first wireless device may delay or sleep before an opportunity to transmit during a transmission opportunity of the second wireless device will be available.

144 Claims, 9 Drawing Sheets

(56) References Cited

U.S. PATENT DOCUMENTS

| | | | |
|---|---|---|---|
| 2003/0231656 A1 | 12/2003 | Wahl | |
| 2006/0221879 A1* | 10/2006 | Nakajima | H04W 74/0808 370/310 |
| 2007/0037548 A1* | 2/2007 | Sammour | H04W 52/0235 455/343.2 |
| 2007/0058605 A1* | 3/2007 | Meylan | H04W 72/0406 370/346 |
| 2007/0248117 A1* | 10/2007 | Zuniga | H04W 74/06 370/468 |
| 2009/0238160 A1* | 9/2009 | Bhatti | H04L 1/1614 370/338 |
| 2009/0252110 A1 | 10/2009 | Sridhara et al. | |
| 2010/0040033 A1* | 2/2010 | Xhafa | H04W 74/004 370/338 |
| 2010/0061342 A1 | 3/2010 | Frederiks et al. | |
| 2010/0165959 A1* | 7/2010 | Park | H04W 72/1215 370/338 |
| 2010/0176929 A1* | 7/2010 | Ozdemir | H04W 74/06 340/10.4 |
| 2010/0189024 A1* | 7/2010 | Xhafa et al. | 370/311 |
| 2011/0080977 A1 | 4/2011 | Liu et al. | |
| 2011/0128900 A1 | 6/2011 | Seok | |
| 2011/0305156 A1 | 12/2011 | Liu et al. | |
| 2012/0188973 A1 | 7/2012 | Meylan et al. | |

OTHER PUBLICATIONS

Samsung, 3GPP TSG RAN WG2 #77, "Autonomous denial for Wi-Fi Beacon," R2-120790, Feb. 6-10, 2012, Dresden, Germany, pp. 1-5.

* cited by examiner

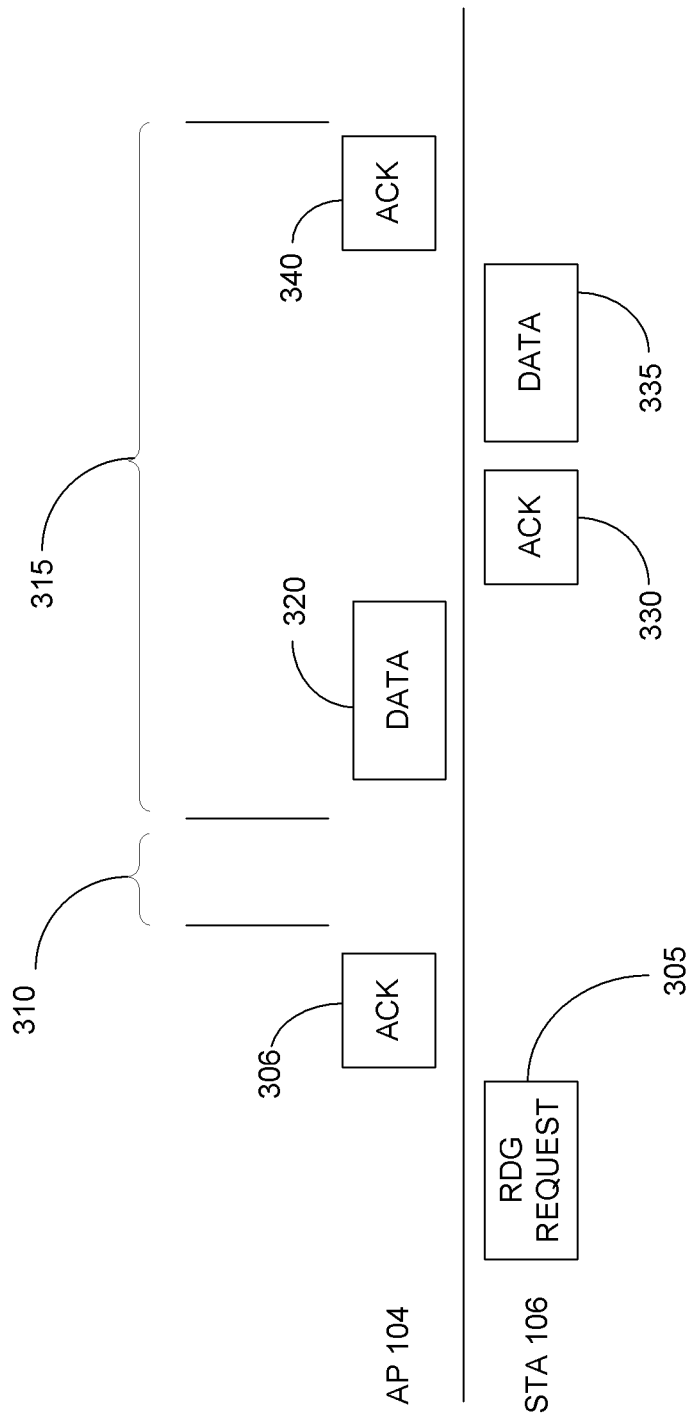

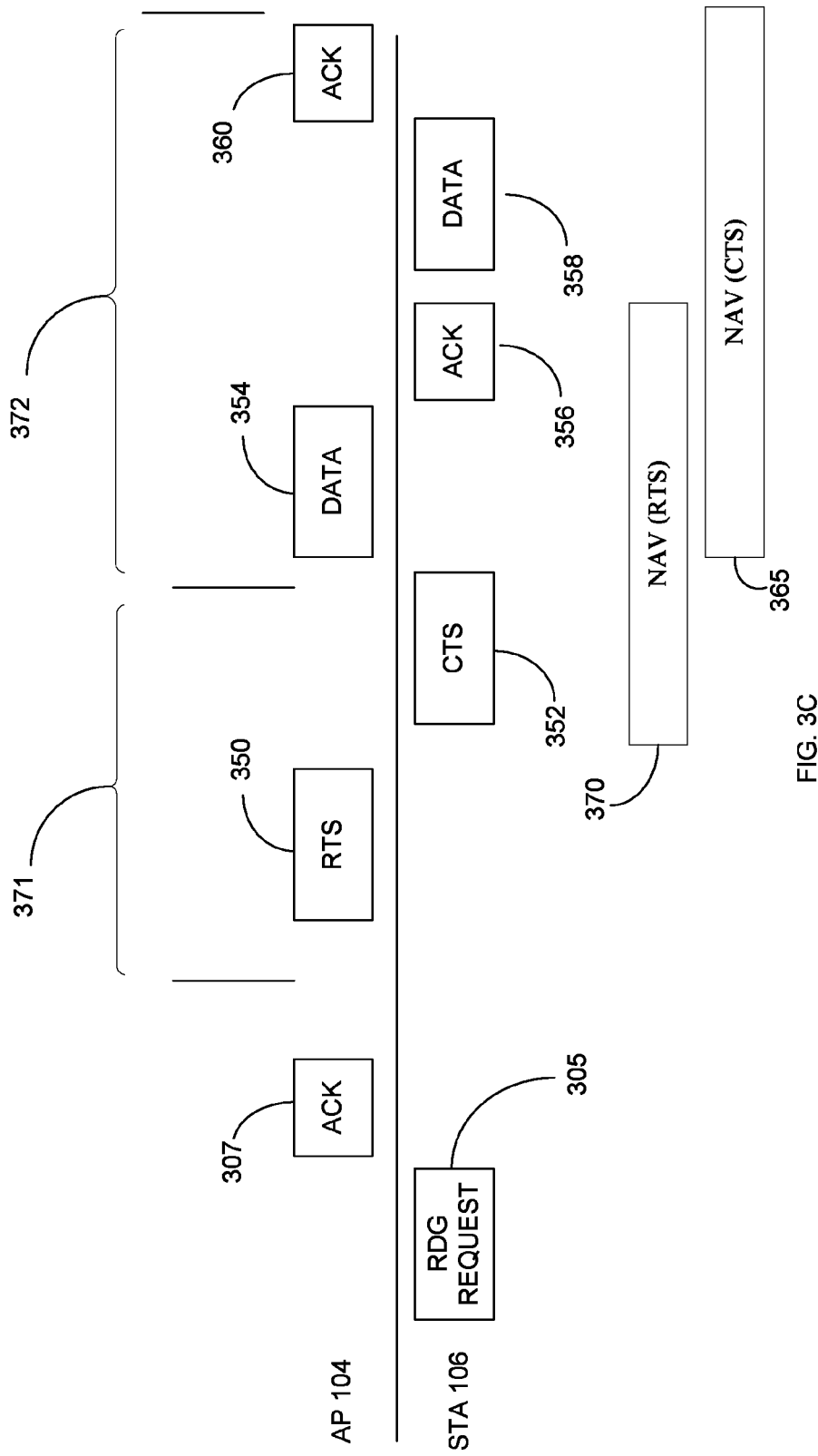

METHODS AND APPARATUS FOR REQUESTED REVERSE DIRECTION PROTOCOL

CROSS REFERENCE TO RELATED APPLICATIONS

This application claims the benefit of U.S. Provisional Application 61/669,632, filed Jul. 9, 2012, and entitled "METHODS AND APPARATUS FOR REQUESTED REVERSE DIRECTION PROTOCOL," and assigned to the assignee hereof. This application also claims the benefit of U.S. Provisional Application 61/699,080, filed Sep. 10, 2012, and entitled "METHODS AND APPARATUS FOR REQUESTED REVERSE DIRECTION PROTOCOL," and assigned to the assignee hereof. This application also claims the benefit of U.S. Provisional Application 61/763,413, filed Feb. 11, 2013, and entitled "METHODS AND APPARATUS FOR REQUESTED REVERSE DIRECTION PROTOCOL," and assigned to the assignee hereof. The disclosures of these prior applications are considered part of this application, and are hereby incorporated by reference in their entirety.

BACKGROUND

1. Field

The present application relates generally to wireless communications, and more specifically to systems, methods, and devices for allocating a wireless transmission medium between a first and a second wireless device.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

A transmission medium in a wireless network may have a limited capacity. The transmission medium capacity may be allocated to nodes of the wireless network using a variety of protocols or methods. In some instances, a portion of the medium's transmission capacity may be allocated to a wireless node, but may be in excess of the transmission capacity needed by the node at a particular time. This may result in some portions of the medium's transmission capacity being unused. Thus, improved systems, methods, and devices for allocating transmission capacity in a wireless network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between first and second devices in a wireless network. In an embodiment, the first and second devices may be access points and stations in the wireless network.

One innovative aspect includes a method for allocating a transmission medium between a first wireless device and a second wireless device on a wireless network. The method includes receiving a request from the first wireless device for permission to transmit during a transmission opportunity of the second wireless device, and transmitting a message to the first wireless device granting permission to transmit during a transmission opportunity of the second wireless device in response to the request.

Another innovative aspect is an apparatus for allocating a transmission medium between a first wireless device and a second wireless device in a wireless network. The apparatus includes a receiver configured to receive a request from the first wireless device for permission to transmit during a transmission opportunity of the second wireless device, and a transmitter configured to transmit a message to the first wireless device granting permission to transmit during a transmission opportunity of the second wireless device in response to the request.

Another innovative aspect is an apparatus for allocating a transmission medium between a first wireless device and a second wireless device on a wireless network. The apparatus includes a means for receiving a request from a first wireless device for permission to transmit during a transmission opportunity of a second wireless device, and a means for transmitting a message to the first wireless device granting permission to transmit during a transmission opportunity of the second wireless device in response to the request.

Another innovative aspect is a non-transitory computer readable medium comprising instructions that when executed cause a processor to perform the method of receiving a request from a first wireless device for permission to transmit during a transmission opportunity of a second wireless device, and transmitting a message to the first wireless device granting permission to transmit during a transmission opportunity of the second wireless device in response to the request.

Another innovative aspect is a method of allocating a transmission medium between a first wireless device and a second wireless device on a wireless network. The method includes transmitting a request to the second wireless device for permission to transmit data during the second wireless device's transmission opportunity, and receiving a message granting permission to transmit the data during the transmission opportunity of the second wireless device.

Another innovative aspect is an apparatus for allocating a transmission medium between first and second wireless device on a wireless network. The apparatus includes a transmitter configured to transmit a request to the second wireless device for permission to transmit data during the transmission opportunity of the second wireless device, and a receiver configured to receive a message granting permission to transmit the data during a transmission opportunity of the second wireless device.

Another innovative aspect is an apparatus for allocating a transmission medium between a first and second wireless device on a wireless network. The apparatus includes means for transmitting a request to the second wireless device for permission to transmit data during a transmission opportunity of the second wireless device, and a means for receiving a message granting permission to transmit the data during a transmission opportunity of the second wireless device.

Another innovative aspect is a non-transitory computer readable medium comprising instructions that when executed cause a processor to perform the method of transmitting a request to a second wireless device for permission to transmit data during the second wireless device's transmission opportunity, and receiving a message granting permission to transmit the data during the second wireless device's transmission opportunity.

BRIEF DESCRIPTION OF THE DRAWINGS

FIG. 3A is a timing diagram of a message exchange allocating a transmission medium between a first and second wireless device.

FIG. 3C is a timing diagram of one embodiment of a message exchange allocating a data communications medium between an access point and a station.

DETAILED DESCRIPTION

Figure 1:
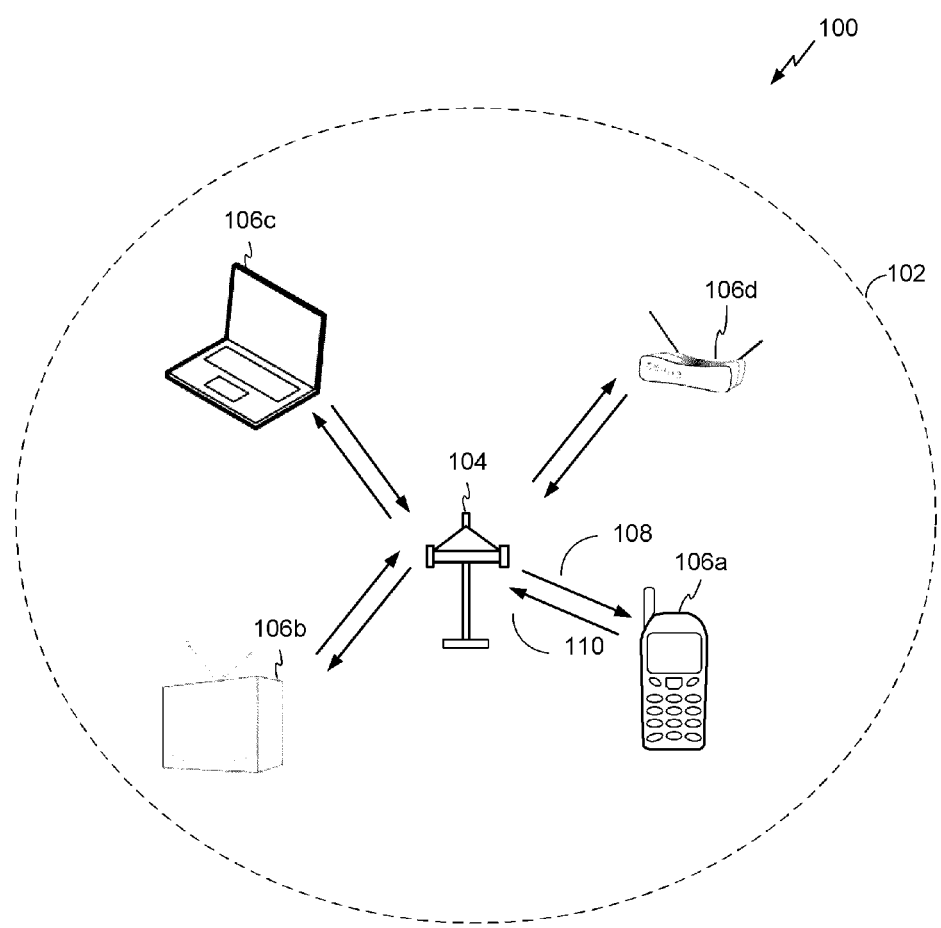
FIG. 1 shows an exemplary wireless communication system 100. The wireless communication system may operate pursuant to a wireless standard, for example any one of the 802.11 standards.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement any one of the 802.11 standards, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Some embodiments of wireless network may experience asymmetric traffic and data rates. For example, because access points may be able to transmit with relatively high power, transmissions from a second wireless device may achieve a high data rate for downlink traffic. In some embodiments, stations may be of relatively lower power and may sustain lower data rates for uplink traffic.

Additionally, some stations may be power constrained. To minimize a station's power usage, it may be desirable to improve a station's ability to operate in a sleep state to extend the battery life of the station. One method to increase the time a station may operate in a sleep state is to reduce the time required for a station to uplink data to a second wireless device.

In some wireless networks, for example 802.11 networks, a station may transmit data by either transmitting during a contention time period or by reserving a transmission opportunity during a contention free time period. If data is transmitted during a contention time period, a collision may result from the transmission. A collision may then require a station to delay transmission according to one or more collision resolution methods. This may inhibit the station's ability to enter a sleep state until the collision is resolved and the data is successfully transmitted.

If the station reserves a transmission opportunity during a contention free time period, the station may also be inhibited from entering a sleep state for a time period. For example, one method of reserving a content free transmission opportunity is to transmit a request-to-send message. A second wireless device controlling access to the medium during the contention free period may respond with a clear-to-send message. This may then provide a transmission opportunity for the station. However, transmitting the request-to-send message, if transmitted during a contention period, may result in a collision that, as discussed above, may consume additional time to resolve. The station may also be inhibited from entering a sleep state until it receives at least the clear to send message from the access point, also inhibiting the station's ability to enter a sleep state.

Proposed herein are methods, apparatus, and systems that provide for a first wireless device to request a reverse direction grant (RDG) from a second wireless devices to improve the utilization of a wireless data communications medium during a transmission opportunity (TXOP) of the second wireless device. The reverse direction protocol enables the second wireless device to grant permission for a first wireless device to transmit data during a transmission opportunity time period reserved for transmissions of the second wireless device. By utilizing at least a portion of the second wireless device's transmission opportunity, the time necessary for a first wireless device to uplink data to a second wireless device may be reduced. This reduction in time can provide for longer sleep periods and thus a longer battery life of the first wireless device. While in the following description of the disclosed embodiments the first wireless device may be referred to as the station and the second wireless device will be referred to as the access point, those skilled in the art will appreciate that the methods described herein may be applied to any two types of wireless devices.

In an embodiment, the amount of data a wireless device is waiting to send may be insufficient to consume all of the time available in the wireless device's transmission opportunity when the waiting data is transmitted. The time remaining in the transmission opportunity after all of its own data has been sent may be allocated to one or more other wireless devices. An ability for another wireless device to request use of a portion of the wireless device's transmission opportunity is described below.

A station operating on a wireless network may awake from a sleep state and send a message to a second wireless device to determine if the second wireless device has any data waiting to be sent to the station. In an embodiment, the message sent to the second wireless device is a "ps-poll" message or in general, a trigger frame. Proposed is a request message sent from a first wireless device to a second wireless device that includes an indication that the first wireless device is requesting a reverse direction grant from the second wireless device. This request message may be considered a reverse direction grant request. If granted, the first wireless device is permitted to transmit data during a portion of a transmission opportunity of the second wireless device.

In another embodiment the reverse direction grant request may be implicit and agreed to beforehand (for example during an association) between the first and second wireless devices. In some aspects, whether the first and/or second wireless device will support the reverse direction grant request may be negotiated between the first and/or second wireless device before the reverse direction grant request is transmitted. For example, the first and second wireless devices may exchange management frames to negotiate whether reverse direction grant requests will be exchanged. In some aspects, the negotiation may define time periods when a device may provide a reverse direction grant. In some aspects, these time periods may be repeating or periodic.

In one embodiment, the request message is a "ps-poll" or the trigger frame. In this embodiment, the reverse direction grant request can be indicated by a "more data" bit or an uplink data indication included in the ps-poll message. In one aspect, this indication may be a single bit specifying whether or not the first wireless device has buffered uplink data. In other aspects, more bits may be used as an indication that the first wireless device has buffered uplink data. The multiple bits may be used to indicate not only that the first wireless device has buffered uplink data, but also the amount of data buffered for uplink. In one aspect, the multiple bit indication may indicate an estimated transmission time as a multiple of a time unit. For example in an aspect utilizing a 9 bit indication, the first wireless device can indicate that up to 512 TUs (e.g., symbols) may be necessary to transmit its buffered uplink data.

By utilizing a portion of a second wireless device's transmission opportunity to transmit data, the first wireless device may transmit with reduced risk of delays associated with collisions, as the transmission opportunity has previously been reserved for transmissions by the second wireless device. Additionally, the disclosed method of allocating a data communications medium for the first wireless device's transmission may be relatively efficient compared to other methods as described above. For example, the request by the first wireless device for a reverse direction grant may in some embodiments be embedded in an existing control frame exchange between the first and second wireless devices. Thus, the first wireless device may be able to obtain permission to transmit during a transmission opportunity of the second wireless device without transmitting any additional messages on the wireless network.

FIG. 1 shows an exemplary wireless communication system 100. The wireless communication system 100 may operate pursuant to a wireless standard, for example the 802.11 standards. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

During transmission of downlink data from an AP 104 to a STA 106, data may be transmitted from the AP 104 to the STA 106 during a transmission opportunity of the access point. The AP 104 may indicate in one or more data transmissions to the STA 106 that it is granting the STA 104 a reverse direction grant. This reverse direction grant is not provided in response to a request by the STA 104, but instead is provided independently by the AP 104 to allow the STA 104 to send an acknowledgement message for one or more data messages sent to the STA 104 by the AP 104 during the transmission opportunity of the AP 104. By allowing acknowledgement messages to be sent during the transmission opportunity of the AP 104, downlink data may be sent by the AP 104 during the transmission opportunity without providing a separate transmission opportunity to the STA 106 to acknowledge the data. This may improve throughput and data communication medium utilization.

Proposed herein is an ability for a first wireless device to request permission to transmit data during a transmission opportunity of a second wireless device. In some embodiments, the first wireless device may be the STA 106 discussed above. In some embodiments, the second wireless device may be AP 104 discussed above. This may improve transmission media utilization and reduce the amount of time a STA 106 in inhibited from entering a sleep state.

Figure 2:
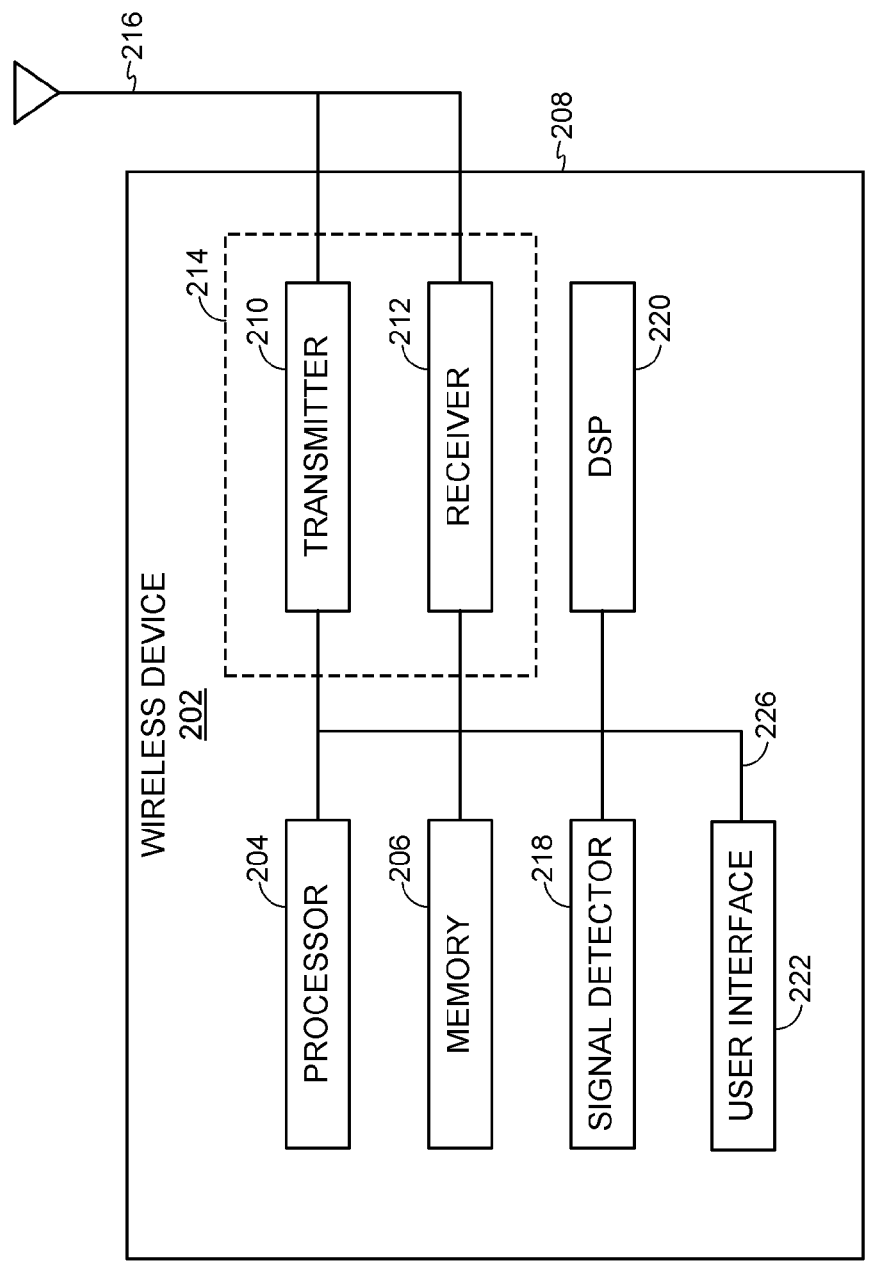
FIG. 2 shows an exemplary functional block diagram of a wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104, or one of the STAs 106. The wireless device 202 may comprise a first wireless device or a second wireless device.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104, or a STA 106, and may be used to transmit and/or receive communications. That is, either AP 104, or STA 106, may serve as transmitter or receiver devices. Certain aspects contemplate signal detector 218 being used by software running on memory 206 and processor 204 to detect the presence of a transmitter or receiver.

FIG. 3A is a timing diagram of one embodiment of a message exchange allocating a data communications medium between an access point and a station. In some aspects, the messages exchanged in FIG. 3A may be preceded by a negotiation between the AP and the STA defining whether a reverse direction grant request transmitted by the STA is supported. The timing diagram starts at the left with a station (STA) sending a reverse direction grant request message 305 to the access point. The reverse direction grant request message requests permission for the station to transmit data during a transmission opportunity of a second wireless device. In an embodiment, the message 305 may be a "ps-poll" message or any trigger frame. In an embodiment, the request message 305 includes an indication of a duration of time for which permission to transmit is sought by the station. For example, in an embodiment, the station may determine an amount of data available to transmit. The station may then determine a duration of time required to transmit the amount of data. In one aspect, the duration may be indicated in an uplink data indication (UDI) field of a ps-poll message. The station may then specify the duration in the request 305. In an embodiment, the station may include in the request 305 the amount of data available to transmit and the intended MCS to be used for transmitting the data. In another embodiment the devices may implicitly agree (for example during association) to reserve the remaining portion of their TXOP to each other. In some aspects, the devices may exchange management frames to negotiate whether a remaining portion of a TXOP may be granted to one device by another. In some aspects, this negotiation may be performed via the exchange of management frames. Similarly, a duration value may also be negotiated beforehand or the access point may allocate the maximum TXOP for each transmission opportunity.

The access point then transmits an acknowledgement message 306 to the station acknowledging the RDG request message 305. The acknowledgement message 306 may include an indication that permission to transmit during a transmit opportunity of the access point is granted. In an embodiment, the acknowledgment message 306 may also include a duration field, indicating a period of time for which the station has permission to transmit during a transmission opportunity of the access point In an embodiment, the acknowledgement message 306 may include a delay field, indicating a period of time after which the access point expects the station to be able to transmit during the transmission opportunity of the access point. In an embodiment, the delay field may indicate a duration of time after which the access point will initiate packet exchange with the station. In an embodiment, the station may sleep for a time period based on the delay after receiving the acknowledgement message 306.

In an embodiment, the ACK message 306 may include a reverse direction MCS field which may be used by the station for rate adaptation purposes. The reverse direction MCS can be calculated with any method based on the SNR of the received RDG request message 305 or any other rate adaptation metric. In addition the access point may use the reverse direction MCS field to correctly calculate the NAV to be allocated for reverse direction data. In one embodiment the delay field may have a zero (0) value indicating that the data exchange may begin at a SIFS time after the ACK is sent.

In the illustrated embodiment, the acknowledgement message 306 may include a "more data" indication that is set, indicating that the station should expect data to be transmitted from the AP 104 to the station 106 before the STA 106 can transmit during an AP 104 transmission opportunity. In an embodiment (not shown), the acknowledgement 306 may include an indication that the requested reverse direction grant was not granted. In this embodiment, the acknowledgement 306 may also include a sleep field (which may be the same delay field discussed above), indicating an amount of time the station may sleep before receiving data from the access point. In this embodiment, the station may sleep for a time period based on the sleep field. After the station wakes from the sleep period, it may send a ps-poll message to the access point. In an embodiment, no ps-poll message will be sent in response to the station waking up, but the station may instead wait for data to be transmitted to the station by the access point.

In the illustrated embodiment, the wireless medium then enters a contention period 310. After the contention period 310, a transmission opportunity of the access point 315 begins. During the transmission opportunity of the access point 315, the access point 104 transmits data 320 to the station 106. In an embodiment, AP 104 transmitting data 320 to the STA 106 is consistent with a "more data" indication in the acknowledgement message 306 discussed above. The data 320 may include an indication that the station is granted permission to transmit during the transmission opportunity of the access point 315. For example, a bit in a packet header (e.g., RDG/More PPDU bit) of the data may be reserved for the indication. When the bit is set, it may indicate permission is granted. The station responds to the data 320 with an acknowledgement packet 330. In another embodiment the station may immediately respond with its own data using the reverse direction grant and may piggyback the acknowledgement with the data. In other embodiments different types of reverse direction grant protocols may be used.

While the access point is shown transmitting a data packet 320 at the start of the transmission opportunity 315, in some embodiments, the access point may have no data to send. This indication may be consistent with the more data indication in the ack message. An example of this is shown in FIG. 3B below.

After transmitting the acknowledgment packet 330, the station transmits data 335 during the transmission opportunity of the access point 315. The data 335 may include one or more separate data packets. In an embodiment, the data 335 may be addressed to the access point (shown). In an embodiment, the data may be addressed to a node other than the access point (not shown). In an embodiment (not shown), the data may also be broadcast or multi-cast. In one embodiment the data 335 may be sent using a preferred MCS indicated by the access point in the acknowledgement message. In the illustrated embodiment, after the data 335 is transmitted by the station, the access point 104 responds with an acknowledgement packet 340. In an embodiment, the access point may transmit a CF-END frame (not shown) to end the transmission opportunity 315 after the STA 106 transmits the data 335.

Note that while FIG. 3A shows the AP 104 transmitting a set of messages and the STA 106 transmitting a set of messages, one with skill in the art would recognize that in other embodiments, any type of node could transmit either set of messages.

Figure 3B:
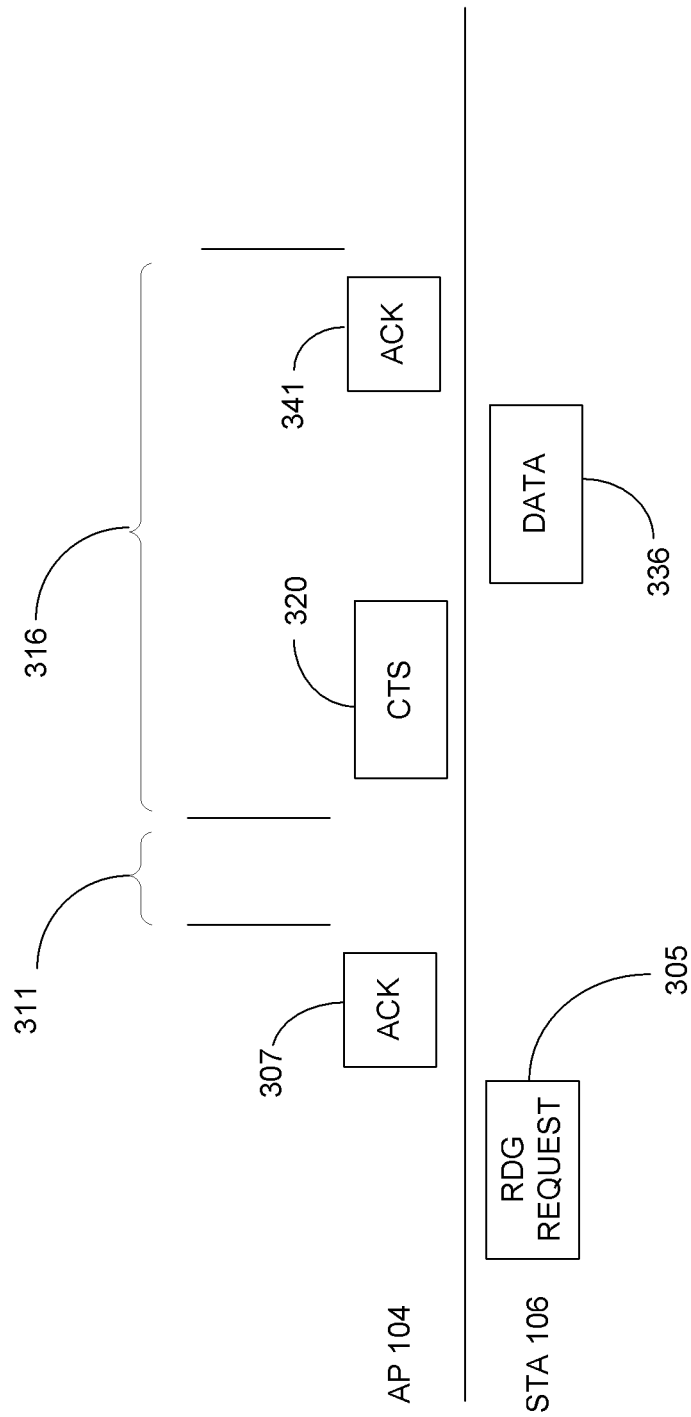
FIG. 3B is a timing diagram of a message exchange allocating a transmission medium between a first and second wireless device.

FIG. 3B is a timing diagram of one embodiment of a message exchange allocating a data communications medium between an access point and a station. In some aspects, the messages exchanged in FIG. 3B may be preceded by a negotiation between the AP and the STA defining whether a reverse direction grant request transmitted by the STA is supported. In some aspects, this negotiation may be performed via the exchange of management frames. The timing diagram starts at the left with a station (STA) 106 sending a reverse direction grant request message 305 to the access point. The reverse direction grant request message requests permission for the station to transmit data during a transmission opportunity of a second wireless device.

The access point then transmits an acknowledgement message 307 to the station acknowledging the RDG request message 305. The acknowledgement message 307 may include an indication that permission to transmit during a transmission opportunity of the access point is granted. In an embodiment, the acknowledgment message 307 may also include a duration field, indicating a period of time for which the station has permission to transmit during a transmission opportunity of the access point In an embodiment, the acknowledgement message 307 may include a delay field, indicating a period of time after which the access point expects the station to be able to transmit during the transmission opportunity of the access point. In an embodiment, the station may sleep for a time period based on the delay after receiving the acknowledgement message 307.

In an embodiment, the acknowledgement message 307 may include a "more data" indication that is clear ("more data"=0). If permission to transmit during a second wireless device transmission opportunity is granted by the acknowledgement message 307, a clear "more data" indication may indicate the STA 106 will receive a trigger frame from the AP 104 when it is allowed to transmit during an AP transmission opportunity.

The wireless medium then enters a contention period 311. After the contention period 310, a transmission opportunity of the access point 316 begins. During the transmission opportunity of the access point 316, the access point 104 transmits a trigger frame 320 to the station 106. In the illustrated embodiment, the trigger frame is a clear-to-send message. Alternatively, the access point 104 may send a QOS Null message to the station 106 as a trigger frame. In general the trigger frame can be any control, management or data frame.

Transmission of the trigger frame at the start of the transmission opportunity 316 is consistent with the "more data" indication being clear in the acknowledgement message 307. The trigger frame 320 may include an indication that permission for the STA 106 to transmit during the transmission opportunity 316 is granted. In another embodiment, the two peer wireless devices may implicitly agree to grant a RDG to each other during association or with periodic management frames (e.g. beacons). An implicit agreement may provide the same or similar functions as the trigger frame 320.

In some aspects, the two peer wireless devices may exchange management frames to define a periodic reverse direction grant of the TXOP of one device to the other device. In some aspects, this exchange of management frames may further define a duration of time of the periodic reverse direction grant or a duration of time between each reverse direction grant. In this aspect, an access point may transmit a reverse direction grant indication periodically at the agreed to times. A station may schedule itself to wake-up so as to receive the reverse direction grant from the access point and transmit uplink frames after the reverse direction grant is received as described further below.

The station then transmits data 336 during the transmission opportunity of the access point 316. The data 336 may include one or more separate data packets. In an embodiment, the data 336 may be addressed to the access point (shown). In an embodiment, the data may be addressed to a node other than the access point (not shown). In an embodiment (not shown), the data may also be broadcast or multi-cast. In the illustrated embodiment, after the data 336 is transmitted by the station, the access point 104 responds with an acknowledgement packet 341. In an embodiment, the access point may transmit a CF-END frame (not shown) to end the transmission opportunity 316 after the STA 106 transmits the data 336. In another embodiment, the CF-END may also be sent if the STA is unresponsive for a time that exceeds SIFS time (+1 slot).

While FIG. 3B illustrates an access point 104 transmitting a first set of messages and station 106 transmitting a second set of messages, one with skill in the art would recognize that either an access point or a station could transmit either the first set and/or the second set of messages.

In one embodiment the 'more data' bit can be utilized by the access point (or in general the second wireless device) to indicate that a reverse direction grant will be granted. In such an embodiment, the AP (or in general the second wireless device) may set the more data bit in response to receiving a reverse direction grant request, such as request 305 (which may be a ps-poll or a trigger frame in one aspect). For example, the acknowledgement message 307 may have its more data bit set to 1. The AP may set the more data bit even if it has no downlink data buffered for the STA as shown in FIG. 3B. In this embodiment, instead of sending the downlink buffered units after the contention period 311, the AP can send a downlink frame (CF-Poll, Qos Null, CTS-to-Self, etc) which has the purpose of granting the remaining portion of the TXOP (or NAV) to the STA (or in general the first wireless device). The downlink frame may be sent after a time period based on a sleep duration field. The downlink frame initiates a packet exchange with the STA and sets the NAV to protect the STA's uplink transmission. In this embodiment, the downlink frame 320 is the initiator of the reverse direction grant.

In some aspects, the STA may not have any uplink data buffered to be transmitted to the access point. For example, this may occur when uplink data reaches its maximum lifetime. Alternatively, multiple scheduled reverse direction grants may be established between the AP and the STA, such that the STA may not always have enough data to fill each (potentially periodic) reverse direction grant from the access point. In some of these aspects, the STA may transmit a null data frame to indicate that it has no additional data to sent. In response to receiving the null data frame, the access point may transmit one or more wireless messages to cancel any remaining reverse direction grant transmission opportunity to the station.

In other aspects, when the STA has no data available to transmit during a granted TXOP, the STA may not transmit any data during the granted TXOP. In response to not receiving any data from the STA, the AP may reset the NAV (or in other terms, free the TXOP) by transmitting a "CF-END" frame or alternatively a clear-to-send message to itself with a duration field set to zero. This can include a null data packet (NDP), clear-to-send, or clear to send to self. In some aspects, these messages include a bit indicating to receiving devices that they should reset their NAV (instead of setting the NAV).

In one aspects, a null data packet CTS may reset the NAV by including in a duration field a value equal to a NAV set by other STAs. In this aspect, a STA may transmit an NDP CTS (to self). This may set the NAV to all the STAs that successfully receive the NDP CTS) with a duration field set to a value indicating that the NAV lasts up to a an indicated time T. Next, the same STA may transmit another NDP CTS (to self) to reset the NAV for all the STAs that successfully receive the second NDP CTS) by setting the duration field to a second value indicating a time interval up to the time T plus or minus a permitted delta to allow for errors.

A reverse direction grant may utilize any method that provides an implicit or explicit indication that the STA can transmit any type of frame SIFS time after receiving the downlink frame by the AP. Note that the method is applicable to any devices, not only between an AP and STA.

FIG. 3C is a timing diagram of one embodiment of a message exchange allocating a data communications medium between an access point and a station. In some aspects, the messages exchanged in FIG. 3B may be preceded by a negotiation between the AP and the STA defining whether a reverse direction grant request transmitted by the STA is supported. In some aspects, this negotiation may be performed via the exchange of management frames. The timing diagram starts at the left with a station (STA) sending a reverse direction grant request message 305 to the access point. The RDG request message 305 is acknowledged by acknowledgement message 307. After the acknowledgement message is transmitted, the wireless medium enters a contention period 371. During the contention period, the access point may transmit a request to send message 350. The request to send message 350 may indicate a NAV period 370 for transmission of data by the AP 104. In response, the station may transmit a clear-to-send message 352. In an embodiment, the clear-to-send message 352 may indicate a NAV period 365 that additionally indicates the period of time necessary for the station to send data it intends to send as part of its reverse direction grant, i.e., the NAV duration is extended to include the time necessary for the station to send its data. In another embodiment, the CTS frame may set a "more data" bit to indicate that it has data for the access point. After the clear-to-send message 352 is transmitted by the STA 106, the wireless medium enters a contention free period 372. The contention free period 372 may be based, at least in part, on the NAV period 365 indicated by the CTS message 352 transmitted by the station.

This contention free period 372 may correspond to a transmission opportunity of the access point 104. The AP 104 may then transmit data packet 354 which is then acknowledged by the STA 106 with ACK message 356. STA 106 may then send data packet 358 to the access point during the transmission opportunity of the access point. Note that data packet 358 is sent during a contention free period 372 that was extended relative to the NAV period 370 indicated by the request-to-send message 350. The data message 358 is then acknowledged by the AP 104 with ACK message 360. Thus, FIG. 3A shows that an RTS/CTS exchange between the AP 104 and STA 106 may extend the non-contention period of the wireless medium, for example, by indicating a NAV period, to ensure adequate time to transmit data by both the AP and the STA 106.

In an embodiment, the AP 104 may deny the extension of the contention free period request by the station in the clear-to-send message 352. For example, the AP 104 may ignore an updated NAV indicated in the clear-to-send message 352 and transmit a NAV value that was in effect prior to the transmission of the CTS message 352. In an embodiment, the AP 104 may deny the extension of the contention free period by clearing a RDG/More PPDU bit in a packet transmitted after the CTS message 352 is received.

In a further embodiment, request-to-send message 350 may not be transmitted by the AP 104, but the clear-to-send message 352 may still be transmitted by the STA 106. In this embodiment, the clear-to-send message 352 may still indicate an indication of an increased NAV value as described above.

In this embodiment, after the CTS message is transmitted, the AP 104 may transmit a packet or message indicating the remaining NAV time period may be used by the station. This indication may be a reverse direction grant bit (RDG/more PPDU bit), or an implicit indication which can be performed by having the access point setting a larger NAV for its communications with the RTS and granting part of the NAV with the data packet.

In another embodiment, a request-to-send and clear-to-send exchange may occur without a preceding ps-poll/acknowledgement sequence. In this embodiment, a station that replies to a request-to-send with a clear-to-send message may include an indication in the clear-to-send message that extends the NAV time period to ensure enough time for the station to send data during a remaining transmission opportunity using the reverse direction protocol. In an embodiment, the indication in the clear-to-send message may extend the NAV period by using a more data bit. In an embodiment, other bits in the frame control portion of the clear-to-send message may be overloaded to provide the indication.

Table 1 below summarizes one embodiments use of indications in request and response messages transmitted on a wireless medium

| RDG Req | RDG Resp | More Data | Sleep Duration | AP Behavior | STA Behavior |
|---|---|---|---|---|---|
| 1 | 0 | 1 | S | Transmit downlink data SIFS (S) time after acknowledgement | ACK Reception of downlink data, do not transmit uplink data during transmit opportunity |
| 1 | 0 | 0 | 0 | AP has no data to transmit. Reverse Direction Not Granted | Do not transmit during AP transmission opportunity |
| 1 | 1 | 1 | 0 | Transmit downlink data SIFS time after ack, Reverse Direction granted to station. | Acknowledge reception of downlink data, use reverse direction grant for uplink transmission. |
| 1 | 1 | 0 | 0 | No data to transmit, reverse direction not granted to station | Transmit uplink data SIFS time after acknowledgement. |
| 1 | 0 | 0 | S | No data to transmit, no reverse direction granted. | Sleep for S ms, do not transmit uplink data during AP transmit opportunity |
| 1 | 1 | 1 | S | Transmit downlink data S ms after acknowledgement, reverse direction granted to station. | Transmit acknowledgement of received downlink data, use remaining portion of transmit opportunity for uplink transmission. |
| 1 | 1 | 0 | S | No data to transmit, reverse direction granted to station. Access point may transmit a trigger frame after S duration of time | Utilize reverse direction grant indicated by trigger frame for uplink transmission. |

Figure 4A:
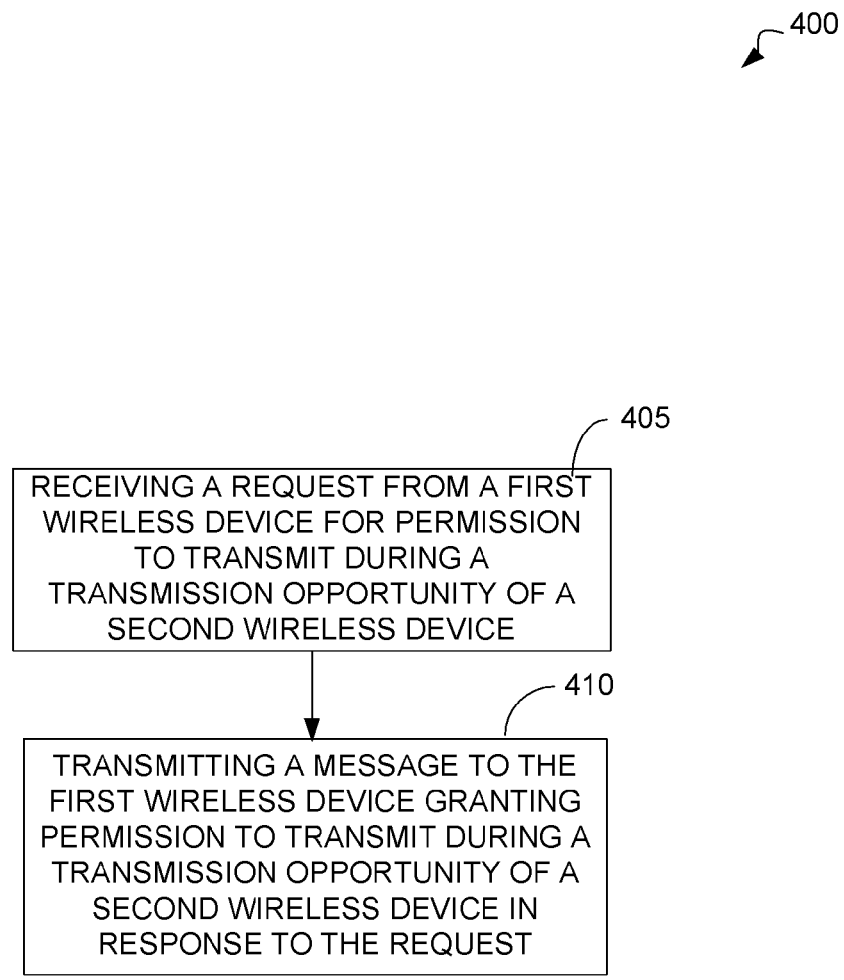
FIG. 4A is a flowchart of a process for allocating a data communications medium between a first and second wireless device on a wireless network.

FIG. 4A is a flowchart of a process for allocating a data communications medium between a first and second wireless device on a wireless communication network. In an embodiment, the first wireless device is a station and the second wireless device is an access point. In an embodiment, process 400 may be performed by an access point, such as access point 104. In an embodiment, process 400 may be performed by wireless device 202, illustrated in FIG. 2. In one aspect, process 400 may be performed by the AP 104 illustrated in FIGS. 3A-C to perform the AP 104's respective portions of the wireless communication exchanges shown in those figures.

In processing block 405, a request from a first wireless device for permission to transmit during a transmission opportunity of a second wireless device is received. In an embodiment, the request for permission may be included as part of a ps-poll request or any type of trigger frame. In an embodiment, the request for permission may specify a duration of time for which permission to transmit is requested.

In block 410 a message is transmitted to the first wireless device granting permission to transmit during a second wireless device transmission opportunity in response to the request. In an embodiment, the message may specify a duration of time for which permission to transmit is granted. In an embodiment, the message may specify a delay time period. In an embodiment, after the delay time period, the first wireless device may expect a frame that activates a reverse direction grant or grants permission to transmit data during a transmission opportunity of the second wireless device. In some embodiments, the first wireless device may sleep for a time based on the delay time period after receiving the transmitted message. In an embodiment, the transmitted message may be an acknowledgement message. In an embodiment, the transmitted message may be a clear-to-send message or a QOS Null message. In an embodiment, the transmitted message may be a data message. The data message may include data or may be a null data message and include no data payload. In some other aspects, the message granting permission may be an acknowledgement message.

The transmitted message may include a "more data" indication. The "more data" indication may indicate whether the second wireless device will send data to the first wireless device before the first wireless device may transmit data during a second wireless device transmission opportunity. In some aspects, if the more data indication is set, process 400 includes transmitting a downlink frame after transmission of the more data indication. In these aspects, the downlink frame indicates that the first wireless device may now transmit during the transmission opportunity of the second wireless device.

In an embodiment, if the "more data" indication is not set, the second wireless device may transmit a second message indicating the first wireless device may begin transmitting during a second wireless device transmission opportunity. In an embodiment, this second message may be a trigger frame. For example, the second message may be a clear-to-send message. In this embodiment, the clear to send message grants permission for the first wireless device to transmit in the transmission opportunity of the second wireless device.

In an embodiment, if the "more data" indication is set, then the second wireless device may transmit a different second message indicating the first wireless device may begin transmitting during a second wireless device transmission opportunity. In an embodiment, the different second message may be a data message. The data message may also include an indication that the first wireless device may begin transmitting data in a transmission opportunity of the access point. This indication may be a reverse direction grant indication.

In some aspects, process 400 may include periodically transmitting a reverse direction grant indication to the first wireless device. In some aspects, process 400 may include periodically transmitting a beacon message indicating one or more transmission opportunities of the second wireless device.

After permission is granted to the first wireless device to transmit during a transmission opportunity, process 400 may further include receiving data from the first wireless device. Before data is received, in some aspects, process 400 may include transmitting a message during the transmission opportunity. For example, the second wireless device may grant permission for the first wireless device to transmit only within a later portion of a transmission opportunity. The second wireless device may use an earlier portion of the transmission opportunity for its own purposes.

In some aspects, process 400 further includes transmitting a message canceling a previously granted permission to transmit during a transmission opportunity. In some aspects, this message is a CF-END message.

In some aspects, process 400 further includes receiving a clear to send message. The clear to send message indicates a request for extension of a contention free time period on the wireless medium. In response, some aspects include transmitting a request to send message indicating a second contention free period on the wireless medium. The second contention free period is different than the first contention free period. Some aspects further include transmitting a message on the wireless medium indicating a contention free period on the wireless medium different than the first contention free period in response to receiving the clear to send message.

Figure 4B:
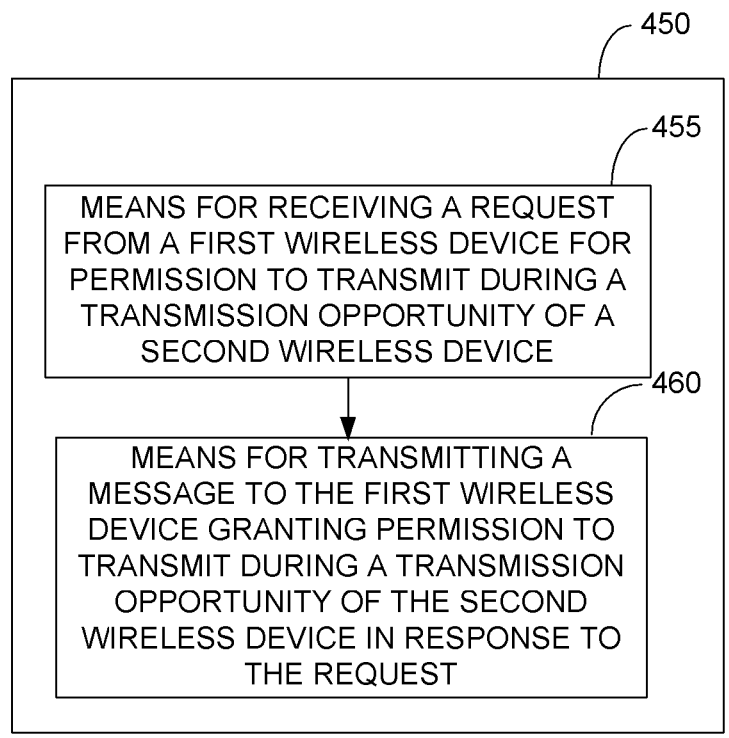
FIG. 4B is a functional block diagram of an exemplary device that may be employed within a wireless communication system.

FIG. 4B is a functional block diagram of an exemplary device 450 that may be employed within the wireless communication system 100. The device 450 includes means for receiving a request from a first wireless device for permission to transmit during a transmission opportunity of a second wireless device. In an embodiment, means 455 may be configured to perform one or more of the functions discussed above with respect to block 405. In an embodiment, the means for receiving a request from a first wireless device for permission to transmit during a transmission opportunity of a second wireless device may include a receiver, such as receiver 212 of FIG. 2. Means 455 may also include one or more of a processor, signal generator, transceiver, decoder, or a combination of hardware and/or software component(s), circuits, and/or module(s).

The device 450 further includes means 460 for transmitting a message to the first wireless device granting permission to transmit during a transmission opportunity of the second wireless device in response to the request. In an embodiment, means 460 may be configured to perform one or more of the functions discussed above with respect to block 410. The means 460 for transmitting a message to the first wireless device granting permission to transmit during a transmission opportunity of the second wireless device in response to the request may include a transmitter, such as transmitter 210 of FIG. 2. Means 460 may also include one or more of a processor, signal generator, transceiver, decoder, or a combination of hardware and/or software component(s), circuits, and/or module(s).

Figure 5A:
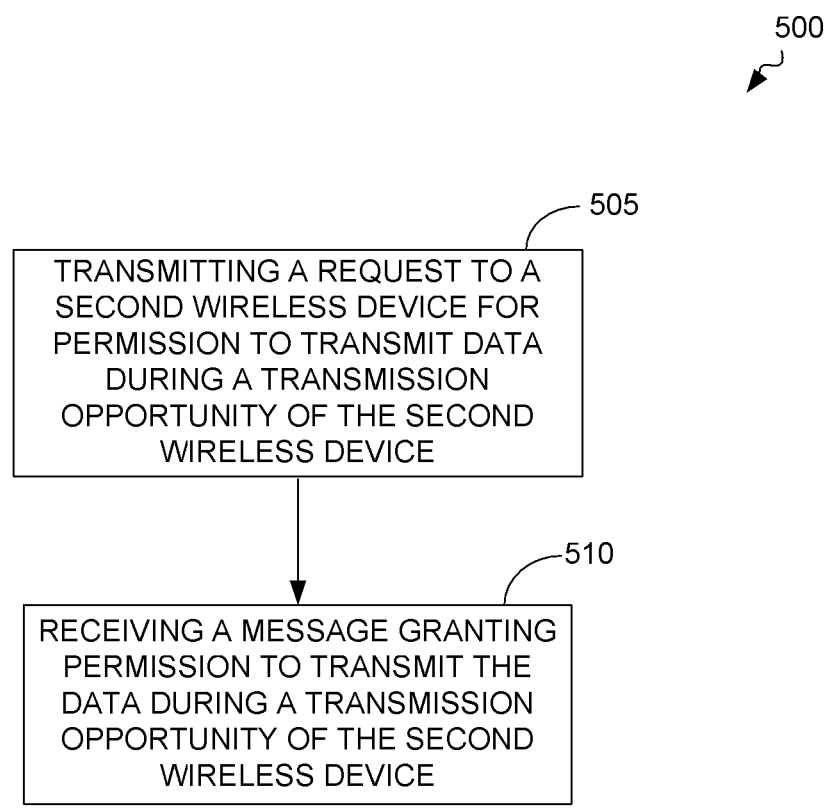
FIG. 5A is a flowchart of a process for allocating a data communications medium between a first and second wireless device on a wireless network.

FIG. 5A is a flowchart of a process for allocating a data communications medium between a first and second wireless device on a wireless communication network. In an embodiment, process 500 may be performed by a station, such as station 106. In an embodiment, the first wireless device is a station and the second wireless device is an access point. In another embodiment, the first wireless device is an access point and the second wireless device is a station. In an embodiment, process 500 may be performed by wireless device 202, illustrated in FIG. 2. In one aspect, process 500 may be performed by the STA 106 illustrated in FIGS. 3A-C to perform the STA 106's respective portions of the wireless communication exchanges shown in those figures.

In processing block 505, a first wireless device transmits a request to a second wireless device for permission to transmit data during a transmission opportunity of the second wireless device. In an embodiment, the first wireless device may be a station. In an embodiment, the request for permission may be included as part of a ps-poll request or any trigger frame. In these aspects, process 500 may include transmitting the ps-poll request or any trigger frame comprising the request for permission to transmit. In an embodiment, the request for permission may specify a requested duration of transmission time. The duration may be an indication of the length of time for which permission to transmit data is requested. In one aspect, the request may further indicate a time period for which permission to transmit is requested. For example, the request may indicate a time period relative to a next or other beacon interval.

In block 510, a message is received granting permission to transmit the data during a transmission opportunity of the second wireless device. In an embodiment, the message may specify a duration of time for which permission to transmit is granted. In some aspects, the received message may include an indication of a length of time after which permission to transmit in a transmission opportunity of the second wireless device will be granted.

In an embodiment, process 500 may include receiving an indication of a delay time period as part of the message granting permission. In an embodiment, after the received delay time period, the first wireless device may expect a frame that activates a reverse direction grant, or grants permission to transmit data during a transmit opportunity of the second wireless device. In some embodiments, the first wireless device may enter a sleep state in response to receiving the message. The first wireless device may sleep for a time period based on the delay time period. For example, the first wireless device may sleep for a time period less than or equal to the delay time period indicated in the message.

In an embodiment, the received message may be an acknowledgement message. In an embodiment, the received message may be a data packet. The data packet may include data or may be a null data message. In an embodiment, the received message may be a clear-to-send message.

In some aspects, the received message may include a more data indication. If the more data indication is set, process 500 may further include receiving data from the second wireless device, the received data indicating that permission to transmit during the transmission opportunity has now been granted. In some aspects, the received data is a downlink frame. In response to receiving the data, process 500 may transmit data during the transmission opportunity of the second wireless device.

Some aspects of process 500 include transmitting data during a transmission opportunity of the second wireless device, based at least in part on the message received that grants permission to transmit. In some aspects, the data is transmitted to a device or node on the wireless network that is not the second wireless device, but is still transmitted during a transmission opportunity of the second wireless device.

Some aspects of process 500 further include transmitting a clear to send message. The clear to send message requests an extension of a contention free time period on the wireless medium. In some aspects, the contention free time period is a transmission opportunity of the second wireless device. In some aspects, the clear to send message includes an indication of the contention free time period. For example, the clear to send message may indicate the contention free time period based on a time reference relative to a beacon interval.

Some aspects of process 500 further include receiving a message indicating a contention free period on the wireless medium different than the first content free period. In some aspects, this message is received in response to the transmission of the clear to send message. In some aspects, this message is a request to send message.

Some aspects of process 500 further include periodically receiving a reverse direction grant indication from the second wireless device.

Figure 5B:
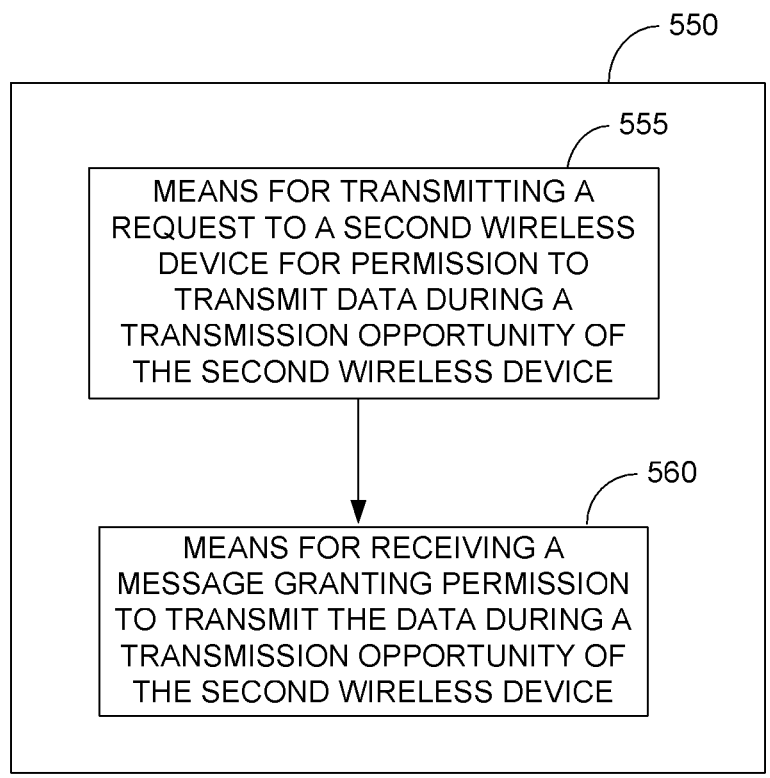
FIG. 5B is a functional block diagram of an exemplary device that may be employed within a wireless communication system.

FIG. 5B is a functional block diagram of an exemplary device 550 that may be employed within the wireless communication system 100. The device 550 includes means 555 for transmitting a request to a second wireless device for permission to transmit data during a transmission opportunity of the second wireless device. In an embodiment, means 555 may be configured to perform one or more of the functions discussed above with respect to block 505. The means 555 for transmitting a request to a second wireless device for permission to transmit data during a transmission opportunity of the second wireless device may include a transmitter, such as transmitter 212 of FIG. 2. Means 555 may also include one or more of a processor, signal generator, transceiver, decoder, or a combination of hardware and/or software component(s), circuits, and/or module(s).

The device 550 further includes means 560 for receiving a message granting permission to transmit the data during a transmission opportunity of the second wireless device. In an embodiment, means 560 may be configured to perform one or more of the functions discussed above with respect to block 510. In an embodiment, the means for receiving a message granting permission to transmit the data during a transmission opportunity of the second wireless device may include a receiver, such as receiver 212 of FIG. 2. Means 560 may also include one or more of a processor, signal generator, transceiver, decoder, or a combination of hardware and/or software component(s), circuits, and/or module(s).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a data communications medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of data communications medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of allocating a data communication medium between an access point and a station on a wireless network, comprising:
   receiving, by an access point, a power-save poll message comprising a request by the station for permission to transmit during a transmission opportunity of the access point; and
   transmitting, by the access point, a message to the station granting permission to transmit during a transmission opportunity of the access point in response to the request.

2. The method of claim 1, further comprising receiving a message specifying a time period for which the permission to transmit is requested.

3. The method of claim 1, further comprising transmitting a duration for which the permission to transmit is granted as part of the message granting permission.

4. The method of claim 1, further comprising transmitting a time period after which a frame granting permission to transmit will be transmitted by the access point.

5. The method of claim 1, further comprising transmitting an acknowledgement comprising the message granting permission.

6. The method of claim 5, further comprising receiving data from the station after the acknowledgement message is transmitted and during the transmission opportunity of the access point.

7. The method of claim 1, further comprising transmitting the message to the station as a data message.

8. The method of claim 7, further comprising receiving data from the station after the data message is transmitted and during the transmission opportunity of the access point.

9. The method of claim 1, further comprising transmitting data during the transmission opportunity of the access point for a first duration less than the transmission opportunity.

10. The method of claim 1, further comprising transmitting a message canceling permission to transmit during the transmission opportunity.

11. The method of claim 10, wherein the message is a Contention-Free End Beacon message.

12. The method of claim 1, further comprising transmitting a beacon signal indicating the access point has a transmission opportunity.

13. The method of claim 1, further comprising transmitting a clear-to-send message indicating the access point has a transmission opportunity.

14. The method of claim 13, wherein the clear-to-send message grants permission for the station to transmit in the transmission opportunity.

15. The method of claim 1, further comprising receiving a clear-to-send message indicating a request for extension of a contention free period on the wireless medium.

16. The method of claim 15, wherein the clear-to-send message includes an indication of a first contention free period.

17. The method of claim 16, further comprising transmitting a request to send message indicating a second contention free period on the wireless medium, the second contention free period different than the first contention free period.

18. The method of claim 16, further comprising transmitting a message on the wireless medium indicating a contention free period on the wireless medium different than the first contention free period in response to receiving the clear-to-send message.

19. The method of claim 1, further comprising:
   transmitting a message to the station in response to the request from the station for permission to transmit during a transmission opportunity of the access point, the transmitted message comprising a more data indication; and
   transmitting a downlink frame after transmitting the message comprising the more data indication to the station in response to the request for permission to transmit, wherein the downlink frame indicates that the station may transmit during the transmission opportunity of the access point.

20. The method of claim 1, further comprising periodically transmitting a reverse direction grant indication to the station.

21. An apparatus for allocating a data communication medium between a station and an access point on a wireless network, comprising:
   a receiver configured to receive a power-save-poll message comprising a request from the station for permission to transmit during a transmission opportunity of the access point; and
   a transmitter configured to transmit a message to the station granting permission to transmit during a transmission opportunity of the access point in response to the request.

22. The apparatus of claim 21, wherein the receiver is configured to receive a time period for which permission to transmit is requested as part of the request.

23. The apparatus of claim 21, wherein the transmitter is further configured to transmit the response granting permission specifying a duration for which permission to transmit is granted.

24. The apparatus of claim 21, wherein the transmitter is further configured to transmit the response granting permission specifying a time period after which a frame granting permission to transmit will be transmitted by the access point.

25. The apparatus of claim 21, wherein the transmitter is further configured to transmit the response granting permission as an acknowledgement message.

26. The apparatus of claim 25, wherein the receiver is further configured to receive data from the station after the acknowledgement message is transmitted and during the transmission opportunity of the access point.

27. The apparatus of claim 21, wherein the transmitter is further configured to transmit the response granting permission as a data message.

28. The apparatus of claim 27, wherein the receiver is further configured to receive data from the station after the data message is transmitted and during the transmission opportunity of the access point.

29. The apparatus of claim 21, wherein the transmitter is further configured to transmit data during the transmission opportunity of the access point for a first duration less than the transmission opportunity of the access point.

30. The apparatus of claim 21, wherein the transmitter is further configured to transmit a message canceling permission to transmit during the transmission opportunity.

31. The apparatus of claim 21, wherein the transmitter is configured to transmit a Contention-Free End Beacon message comprising the message granting permission.

32. The apparatus of claim 21, wherein the transmitter is configured to transmit a beacon signal indicating the access point has a transmission opportunity.

33. The apparatus of claim 21, wherein the transmitter is configured to transmit a clear-to-send message indicating the access point has a transmission opportunity.

34. The apparatus of claim 33, wherein the clear-to-send message grants permission for the station to transmit in the transmission opportunity.

35. The apparatus of claim 21, wherein the receiver is further configured to receive a clear-to-send message indicating a request for extension of a contention free period on the wireless medium.

36. The apparatus of claim 35, wherein the transmitter is configured to include an indication of a first contention free period in the clear to send message.

37. The apparatus of claim 36, wherein the transmitter is further configured to transmit a request to send message indicating a second contention free period on the wireless medium, the second contention free period different than the first contention free period.

38. The apparatus of claim 36, wherein the transmitter is further configured to transmit a message on the wireless medium indicating a contention free period on the wireless medium different than the first contention free period in response to the receiver receiving the clear-to-send message.

39. The apparatus of claim 21, wherein the transmitter is further configured to:
 transmit a message to the station in response to the request from the station for permission to transmit during a transmission opportunity of the access point, the transmitted message comprising a more data indication, and
 transmit a downlink frame after transmitting the message comprising the more data indication to the station in response to the request for permission to transmit, wherein the downlink frame indicates that the station may transmit during the transmission opportunity of the access point.

40. The apparatus of claim 21, further comprising a transmitter configured to periodically transmit a reverse direction grant indication to the station.

41. An apparatus for allocating a data communication medium between a station and a access point on a wireless network, comprising:
 means for receiving a power-save poll message comprising a request from the station for permission to transmit during a transmission opportunity of the access point; and
 means for transmitting a message to the station granting permission to transmit during a transmission opportunity of the access point in response to the request.

42. The apparatus of claim 41, further comprising means for receiving a time period for which permission to transmit is requested.

43. The apparatus of claim 41, wherein the means for transmitting is configured to specify a duration for which permission to transmit is granted in the message.

44. The apparatus of claim 41, wherein the means for transmitting is configured to specify in the message a time period after which a frame granting permission to transmit will be transmitted by the access point.

45. The apparatus of claim 41, wherein the means for transmitting is configured to transmit the message granting permission as an acknowledgement message.

46. The apparatus of claim 41, further comprising means for receiving data from the station after the acknowledgement message is transmitted and during the access point transmission opportunity.

47. The apparatus of claim 41, wherein the means for transmitting is configured to transmit the message granting permission as a data message.

48. The apparatus of claim 41, further comprising means for receiving data from the station after the data message is transmitted and during the transmission opportunity of the access point.

49. The apparatus of claim 41, further comprising means for transmitting data during the transmission opportunity of the access point for a first duration less than the transmission opportunity of the access point.

50. The apparatus of claim 41, further comprising means for transmitting a message canceling permission to transmit during the transmission opportunity.

51. The apparatus of claim 50, further comprising means for transmitting a Contention-Free End Beacon message comprising the message canceling permission.

52. The apparatus of claim 41, further comprising means for transmitting a beacon signal indicating the access point has a transmission opportunity.

53. The apparatus of claim 41, further comprising means for transmitting a clear-to-send message indicating the access point has a transmission opportunity.

54. The apparatus of claim 53, wherein the clear-to-send message grants permission for the station to transmit in the transmission opportunity.

55. The apparatus of claim 41, further comprising means for receiving a clear-to-send message indicating a request for extension of a contention free period on the wireless medium.

56. The apparatus of claim 55, further comprising means for receiving an indication of a first contention free period in the clear to send message.

57. The apparatus of claim 55, further comprising means for transmitting a request-to-send message indicating a second contention free period on the wireless medium, the second contention free period different than the first contention free period.

58. The apparatus of claim 55, further comprising means for transmitting a message on the wireless medium indicating a contention free period on the wireless medium different than the first contention free period in response to the means for receiving the clear-to-send message.

59. The apparatus of claim 41, further comprising:
means for transmitting a message to the station in response to the request from the station for permission to transmit during a transmission opportunity of the access point, the transmitted message comprising a more data indication; and
means for transmitting a downlink frame after transmitting the message comprising the more data indication to the station in response to the request for permission to transmit, wherein the downlink frame indicates that the station may transmit during the transmission opportunity of the access point.

60. The apparatus of claim 41, further comprising means for periodically transmitting a reverse direction grant indication to the station.

61. A non-transitory computer readable medium comprising instructions that when executed cause a processor to perform a method of allocating a data communication medium between a station and an access point on a wireless network, the method comprising:
receiving a power-save poll message comprising a request from the station for permission to transmit during a transmission opportunity of the access point; and
transmitting a message to the station granting permission to transmit during a transmission opportunity of the access point in response to the request.

62. The non-transitory computer readable medium of claim 61, further comprising receiving a time period for which permission to transmit is requested as part of the request.

63. The non-transitory computer readable medium of claim 61, further comprising receiving a power-save poll message comprising the request.

64. The non-transitory computer readable medium of claim 61, further comprising transmitting a duration for which permission to transmit is granted as part of the response granting permission.

65. The non-transitory computer readable medium of claim 61, further comprising transmitting a time period after which a frame granting permission to transmit will be transmitted by the access point as part of the response granting permission.

66. The non-transitory computer readable medium of claim 61, further comprising transmitting an acknowledgement message comprising the message granting permission.

67. The non-transitory computer readable medium of claim 66, to the method further comprising receiving data from the station after the acknowledgement message is transmitted and during the transmission opportunity of the access point.

68. The non-transitory computer readable medium of claim 61, wherein the message transmitted to the station granting permission is a data message.

69. The non-transitory computer readable medium of claim 68, the method further receiving data from the station after the data message is transmitted and during the transmission opportunity of the access point.

70. The non-transitory computer readable medium of claim 61, the method further comprising transmitting data during the transmission opportunity of the access point for a first duration less than the transmission opportunity of the access point.

71. The non-transitory computer readable medium of claim 61, the method further comprising transmitting a message canceling permission to transmit during the transmission opportunity.

72. The non-transitory computer readable medium of claim 71, the method further comprising transmitting a Contention-Free End Beacon message comprising the message canceling permission.

73. The non-transitory computer readable medium of claim 61, the method further comprising transmitting a beacon signal indicating the access point has a transmission opportunity.

74. The non-transitory computer readable medium of claim 61, the method further comprising transmitting a clear-to-send message indicating the access point has a transmission opportunity.

75. The non-transitory computer readable medium of claim 61, wherein the clear-to-send message grants permission for the station to transmit in the transmission opportunity.

76. The non-transitory computer readable medium of claim 61, the method further comprising receiving a clear-to-send message indicating a request for extension of a contention free period on the wireless medium.

77. The non-transitory computer readable medium of claim 76, wherein the clear-to-send message includes an indication of a first contention free period.

78. The non-transitory computer readable medium of claim 76, the method further comprising transmitting a request-to-send message indicating a second contention free period on the wireless medium, the second contention free period different than the first contention free period.

79. The non-transitory computer readable medium of claim 76, the method further comprising transmitting a message indicating a contention free period on the wireless medium different than the first contention free period in response to receiving the clear-to-send message.

80. The non-transitory-computer readable medium of claim 61, the method further comprising:
transmitting a message to the station in response to the request from the station for permission to transmit during a transmission opportunity of the access point, the transmitted message comprising a more data indication; and
transmitting a downlink frame after transmitting the message comprising the more data indication to the station in response to the request for permission to transmit, wherein the downlink frame indicates that the station may transmit during the transmission opportunity of the access point.

81. The non-transitory-computer readable medium of claim 61, the method further comprising periodically transmitting a reverse direction grant indication to the station.

82. A method of allocating a data communication medium between a station and an access point on a wireless network, comprising:
transmitting, by the station, a power-save poll message comprising a request to the access point for permission to transmit data during a transmission opportunity of the access point; and
receiving, by the station, a message granting permission to transmit the data during the transmission opportunity of the access point.

83. The method of claim 82, further comprising transmitting a time period for which permission to transmit is requested as part of the request.

84. The method of claim 82, further comprising transmitting an indication of the length of time for which permission to transmit the data is requested as part of the request.

85. The method of claim 82, further comprising receiving an indication of the length of time after which permission to transmit in a transmission opportunity of the access point will be granted, the indication received as part of the message granting permission.

86. The method of claim 85, further comprising entering a sleep state in response to the message.

87. The method of claim 86, further comprising entering the sleep state for a time period less than or equal to the indication of the length of time in the message.

88. The method of claim 82, further comprising receiving an acknowledgement message comprising the message granting permission.

89. The method of claim 82, further comprising receiving a data message comprising the message granting permission.

90. The method of claim 82, further comprising transmitting a power-save poll message comprising the request for permission.

91. The method of claim 82, further comprising transmitting the data to a node on the wireless network that is not the access point during the transmission opportunity of the access point.

92. The method of claim 82, further comprising transmitting a clear-to-send message requesting an extension of a contention free time period on the wireless medium.

93. The method of claim 92, further comprising transmitting an indication of a first contention free period as part of the clear to send message.

94. The method of claim 93, further comprising receiving a request-to-send message indicating a second contention free period on the wireless medium, the second contention free period different than the first contention free period.

95. The method of claim 93, further comprising receiving a message indicating a contention free period on the wireless medium different than the first contention free period in response to transmitting the clear-to-send message.

96. The method of claim 82, further comprising
  receiving a message comprising a more data indication in response to the request to the access point for permission to transmit data during a transmission opportunity of the access point; and
  in response to receiving the more data indication, transmitting a message during the transmission opportunity of the access point after receiving a downlink frame during the transmission opportunity.

97. The method of claim 82, further comprising periodically receiving a reverse direction grant indication from the access point.

98. An apparatus for allocating a data communication medium between a station and an access point on a wireless network, comprising:
  a transmitter configured to transmit a power-save poll message comprising a request to the access point for permission to transmit data during a transmission opportunity of the access point; and
  a receiver configured to receive a message granting permission to transmit the data during the transmission opportunity.

99. The apparatus of claim 98, wherein the transmitter is configured to specify a time period for which permission to transmit is requested in the request for permission to transmit.

100. The apparatus of claim 98, wherein the receiver is further configured to decode an indication of the length of time for which permission to transmit the data is granted from the message granting permission.

101. The apparatus of claim 98, wherein the receiver is further configured to decode an indication of the length of time after which permission to transmit in a transmission opportunity of the access point will be granted from the message granting permission.

102. The apparatus of claim 98, further comprising a processor configured to enter a sleep state in response to the message.

103. The apparatus of claim 102, wherein the processor is further configured to enter the sleep state for a time period less than or equal to the indication of the length of time in the message.

104. The apparatus of claim 98, wherein the receiver is further configured to receive an acknowledgement message comprising the message granting permission.

105. The apparatus of claim 98, wherein the receiver is further configured to receive a data message comprising the message granting permission.

106. The apparatus of claim 98, wherein the transmitter is further configured to transmit a power-save poll message comprising the request for permission.

107. The apparatus of claim 98, wherein the transmitter is further configured to transmit the data to a device on the wireless network that is not the access point during the transmission opportunity of the access point.

108. The apparatus of claim 98, wherein the transmitter is further configured to transmit a clear-to-send message requesting an extension of a contention free time period on the wireless medium.

109. The apparatus of claim 108, wherein the clear-to-send message comprises an indication of a first contention free period.

110. The apparatus of claim 108, wherein the receiver is further configured to receive a request-to-send message indicating a second contention free period on the wireless medium, the second contention free period different than the first contention free period.

111. The apparatus of claim 108, wherein the receiver is further configured to receive a message indicating a contention free period on the wireless medium different than the first contention free period in response to transmitting the clear-to-send message.

112. The apparatus of claim 98, wherein the receiver is further configured to receive a message comprising a more data indication in response to the request to the access point for permission to transmit data during a transmission opportunity of the access point, and the transmitter is further configured to, in response to receiving the more data indication, transmit a message during the transmission opportunity of the access point after the receiver receives a downlink frame during the transmission opportunity.

113. The apparatus of claim 98, further comprising a receiver configured to periodically receiving a reverse direction grant indication from the access point.

114. An apparatus for allocating a data communication medium between a station and an access point on a wireless network, comprising:
  means for transmitting a power-save poll message comprising a request to the access point for permission to transmit data during the transmission opportunity of the access point; and
  means for receiving a message granting permission to transmit the data during a transmission opportunity of the access point.

115. The apparatus of claim 114, wherein the means for transmitting a request for permission to transmit is configured to specify a time period for which permission to transmit is requested in the request.

116. The apparatus of claim 114, wherein the means for receiving a message granting permission is configured to decode an indication of the length of time for which permission to transmit the data is granted from the message granting permission.

117. The apparatus of claim 114, wherein the means for receiving a message granting permission is configured to decode an indication of the length of time after which permission to transmit in a transmission opportunity of the access point will be granted from the message granting permission.

118. The apparatus of claim 117, further comprising means for entering a sleep state in response to the message.

119. The apparatus of claim 118, wherein the means for entering a sleep state is configured to enter the sleep state for a time period less than or equal to the indication of the length of time in the message.

120. The apparatus of claim 114, further comprising receiving an acknowledgment packet comprising the message granting permission.

121. The apparatus of claim 114, further comprising receiving a data packet comprising the message granting permission.

122. The apparatus of claim 114, wherein the means for transmitting a request for permission is configured to transmit the request in a power-save poll message.

123. The apparatus of claim 114, further comprising means for transmitting the data to a node on the wireless network that is not the access point during the transmission opportunity of the access point.

124. The apparatus of claim 114, further comprising means for transmitting a clear-to-send message requesting an extension of a contention free time period on the wireless medium.

125. The apparatus of claim 124, wherein the means for transmitting the clear-to-send message is configured to include an indication of a first contention free period in the clear to send message.

126. The apparatus of claim 124, further comprising means for receiving a request-to-send message indicating a second contention free period on the wireless medium, the second contention free period different than the first contention free period.

127. The apparatus of claim 124, further comprising means for receiving a message indicating a contention free period on the wireless medium different than the first contention free period in response to the means for transmitting the clear-to-send message transmitting the clear to send message.

128. The apparatus of claim 114, further comprising:
means for receiving a message comprising a more data indication in response to the request to the access point for permission to transmit data during a transmission opportunity of the access point; and
means for transmitting a message during the transmission opportunity of the access point after receiving a downlink frame during the transmission opportunity in response to receiving the more data indication.

129. The apparatus of claim 114, further comprising means for periodically receiving a reverse direction grant indication from the access point.

130. A non-transitory computer readable medium comprising instructions that when executed cause a processor to perform a method of allocating a data communication medium between a station and an access point on a wireless network, the method comprising:

transmitting, by the station, a power-save poll message comprising a request to the access point for permission to transmit data during the transmission opportunity of the access point; and
receiving, by the station, a message granting permission to transmit the data during the transmission opportunity of the access point.

131. The non-transitory computer readable medium of claim 130, the method further comprising transmitting a time period for which permission to transmit is requested as part of the request.

132. The non-transitory computer readable medium of claim 130, the method further comprising receiving an indication of the length of time for which permission to transmit the data is granted.

133. The non-transitory computer readable medium of claim 130, the method further comprising transmitting further comprising receiving an indication of the length of time after which permission to transmit in a transmission opportunity of the access point will be granted.

134. The non-transitory computer readable medium of claim 130, the method further comprising entering a sleep state in response to the message.

135. The non-transitory computer readable medium of claim 130, the method further comprising entering the sleep state for a time period less than or equal to the indication of the length of time in the message.

136. The non-transitory computer readable medium of claim 130, the method further comprising transmitting further comprising receiving an acknowledgement comprising the message granting permission.

137. The non-transitory computer readable medium of claim 130, the method further comprising receiving a data packet comprising the message granting permission.

138. The non-transitory computer readable medium of claim 130, the method further comprising receiving a power-save poll message comprising the request for permission.

139. The non-transitory computer readable medium of claim 130, the method further comprising transmitting the data to a device on the wireless network that is not the access point during the transmission opportunity of the access point.

140. The non-transitory computer readable medium of claim 130, the method further comprising transmitting a clear-to-send message requesting an extension of a contention free time period on the wireless medium.

141. The non-transitory computer readable medium of claim 140, the method further comprising transmitting an indication of a first contention free period as part of the clear to send message.

142. The non-transitory computer readable medium of claim 140, the method further comprising receiving a request-to-send message indicating a second contention free period on the wireless medium, the second contention free period different than the first contention free period.

143. The non-transitory computer readable medium of claim 140, the method further comprising receiving a message indicating a contention free period on the wireless medium different than the first contention free period in response to transmitting the clear-to-send message.

144. The non-transitory computer readable medium of claim 130, the method further comprising periodically receiving a reverse direction grant indication from the access point.

\* \* \* \* \*